(12) United States Patent
White et al.

(10) Patent No.: US 6,269,965 B1
(45) Date of Patent: Aug. 7, 2001

(54) COOLER INSERT FOR CONDIMENT DISPENSING CONTAINERS

(76) Inventors: Richard W. White; Robert J. White, both of 846 No. Dixie Hwy., Lantana, FL (US) 33462

( * ) Notice: Subject to any disclaimer, the term of this patent is extended or adjusted under 35 U.S.C. 154(b) by 0 days.

(21) Appl. No.: 09/518,892

(22) Filed: Mar. 6, 2000

Related U.S. Application Data

(60) Provisional application No. 60/127,709, filed on Apr. 5, 1999.

(51) Int. Cl.[7] .................................................. A47B 57/00
(52) U.S. Cl. .............................. 220/592.18; 220/592.04; 220/592.14
(58) Field of Search ..................... 220/292.18, 592.04, 220/592.14, 592.15, 528, 23.83

(56) References Cited

U.S. PATENT DOCUMENTS

| | | | |
|---|---|---|---|
| 1,786,827 | * 12/1930 | Copeman | 220/592.14 |
| 2,370,034 | * 2/1945 | Haugland | 220/592.04 X |
| 3,052,508 | * 9/1962 | Fink | 220/592.04 X |
| 3,952,905 | * 4/1976 | Rumrill | 220/592.04 X |
| 5,027,972 | * 7/1991 | Bartholomew | 220/528 |
| 5,052,184 | 10/1991 | Jarvis | 62/60 |
| 5,437,165 | 8/1995 | White | 62/465 |
| 5,931,019 | 8/1999 | White | 62/457.7 |

* cited by examiner

Primary Examiner—Steven Pollard
(74) Attorney, Agent, or Firm—Alvin S. Blum

(57) ABSTRACT

An insert fits into the interior of a portable cooler or ice chest. The insert has a planar platform with apertures that support flanged food receptacles by their upper flanges. Attached to the platform at its perimeter is a planar flange to fit onto the inner shoulder of the cooler. This flange is spaced apart from the plane of the platform by a distance sufficient to elevate the tops of the receptacles above the upper edge of the cooler. This presents the contents of the receptacles for better visibility and accessibility by the public. An application is to provide condiments to the purchaser of fast food such as hot dogs.

9 Claims, 2 Drawing Sheets

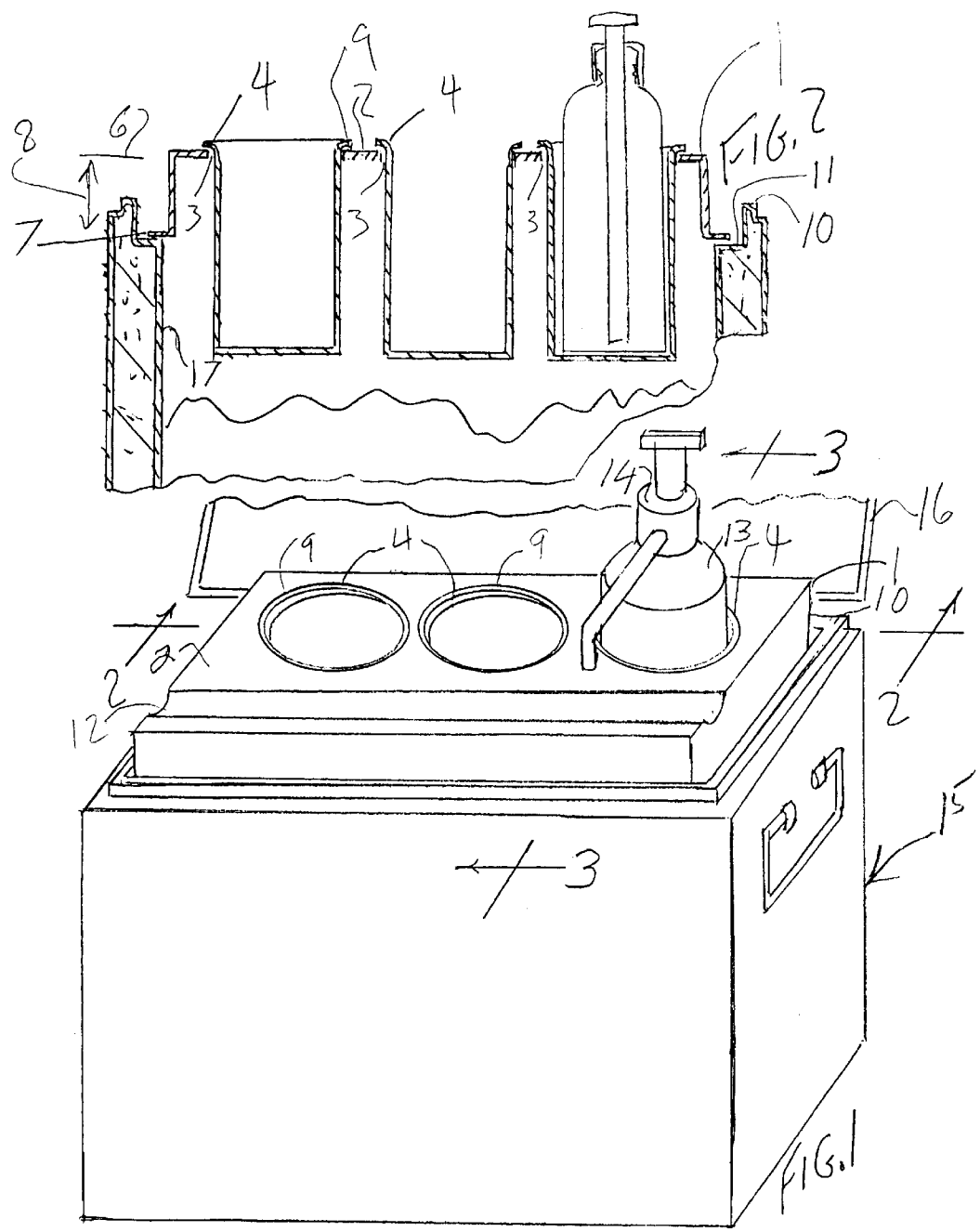

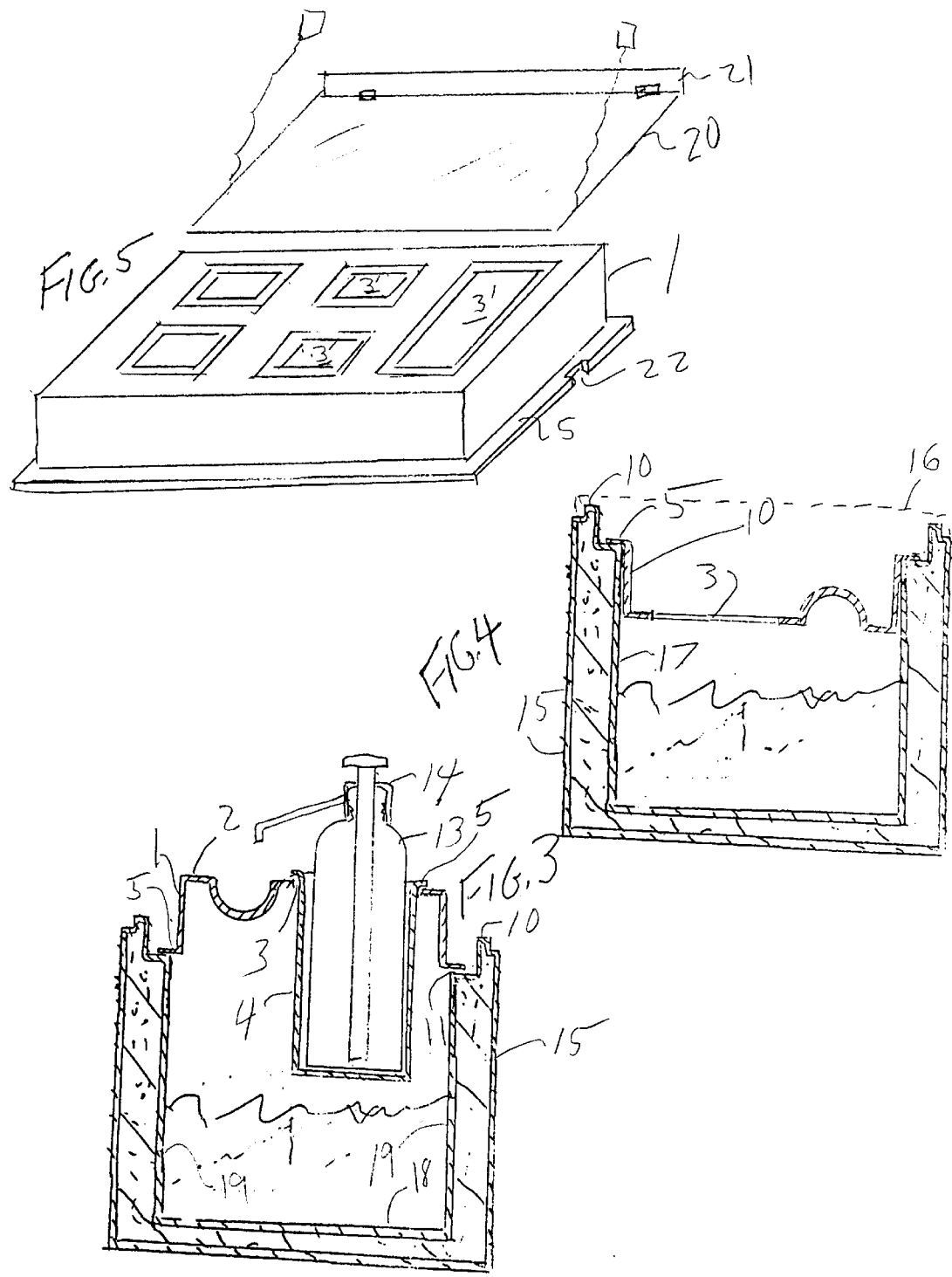

COOLER INSERT FOR CONDIMENT DISPENSING CONTAINERS

This application is based upon Provisional Patent Application Ser. No. 60/127,709 filed Apr. 5, 1999 incorporated herein by reference.

BACKGROUND OF THE INVENTION

This invention relates to portable coolers or insulated ice chests, and, more particularly, to a cooler insert for maintaining containers of condiments in refrigerated condition, while exposing their upper portions for optimal display and in condition for convenient dispensing therefrom.

DESCRIPTION OF THE PRIOR ART

Applicants' U.S. Pat. No. 5,931,019 discloses a perforated bait tray insert assembly for a cooler that rests on the ice in the cooler and descends as the ice melts until a fixed level is reached. An accessory tray has a platform that is supported below a flange that rests on a shoulder of the cooler that is below the cooler top edge.

Applicants' U.S. Pat. No. 5,437,165 discloses a panel with food receptacle receiving apertures that is held below a cooler top. The panel has downwardly extending legs to maintain the panel at a fixed height in the cooler below the cooler top edge, where they are not easily seen or accessed.

Jarvis, in U.S. Pat. No. 5,052,184 teaches a grid platform positioned at a fixed elevation within the cooler by downwardly directed legs. Food stored on the platform is cooled by ice on the platform. Melt water drains through the grid and collects at the bottom of the cooler to cool beverage cans. Cans are accessed by a door in the platform.

When large containers of condiments are stored in a cooler, and are to be exposed for dispensing by the public, it would be useful to have the tops of the condiment containers extend well above the top edge of the coolers for enhanced visibility and accessibility. This is especially useful when the tops of the condiment containers are provided with dispensing pumps such as are commonly found at concession stands for dispensing mustard, ketchup, and mayonnaise, for example.

SUMMARY OF THE INVENTION

It is accordingly an object of the invention to provide an insert means for storing containers of condiments and the like in a portable cooler to keep them cool while at the same time supporting the tops of the condiment containers above the top edge of the cooler for enhanced visibility and accessibility. It is another object of the invention that the insert have a second position for storage within the cooler in which the cooler cover may be closed for storage and transport when not in dispensing configuration. It is yet another object of the invention that the insert occlude the upper portion of the cooler so that the ice will last longer.

The insert of the invention has a planar platform that is provided with perforations large enough to receive the bodies of receptacles, and small enough to prevent passage of the upper flanges of the receptacles. The platform has a flange at its perimeter disposed in a plane parallel to the platform plane and spaced apart therefrom by a distance great enough to present the tops of the receptacles above the upper edge of the cooler when the flange is resting on an upper shoulder of the cooler in the dispensing mode, and to hold the platform below the upper edge of the cooler when the insert is inverted and the cooler lid is closed for the storage and transport mode.

These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a perspective view of the insert of the invention in use in a cooler.

FIG. 2 is a sectional view taken through line 2—2 of FIG. 1.

FIG. 3 is a sectional view taken through line 3—3 of FIG. 1.

FIG. 4 is a sectional view as in Fig.3 with the insert inverted for transport of storage.

FIG. 5 is a perspective view of another embodiment of the invention.

DETAILED DESCRIPTION OF PREFERRED EMBODIMENTS

Referring now to FIGS. 1–4, a food holding insert 1 is removably installed in a portable insulated ice chest or cooler 15. The cooler is one of the type well known in the art having an insulated hinged closure 16, an inner liner 17 with vertical sides 19 that extend from a horizontal bottom 18 to a shoulder 11 and then to the upper edge 10. The insert 1 comprises a substantially planar horizontal platform 2 provided with apertures 4 of a shape and size to permit flanged receptacles 4 to pass therethrough and to prevent the passage of the receptacle flanges. The receptacles are thereby suspended from the platform within the cooler chamber that is being cooled with the ice for reducing spoilage of condiments contained in the receptacles. A flange 5 attached to the perimeter of the platform is disposed in a plane 7 that is parallel to the platform plane 6, and spaced apart therefrom by a distance sufficiently great to support the upper flanged portions of the receptacles above the upper edge 10 of the cooler. When the receptacles are in place, the opening to the ice chamber is substantially occluded, while the contents of the receptacles are being cooled. Metal receptacles may optionally be employed for enhanced thermal conductivity.

When so positioned, the receptacle condiment contents are more visible and accessible to the public users. When provided by a hot dog vendor, for example, the receptacles may hold mustard, ketchup, and relish. It is more convenient to provide the mustard and ketchup in jars 13 with pump tops 14 that fit into the receptacles. The buyer may then hold the food below the pump and dispense the fluid directly onto the food. A depression or trough 12 may be provided in the platform to catch drippings. When the cooler is to be closed for storage or transport, as best seen in FIG. 4, the receptacles are removed, the insert inverted, and returned to the cooler. The receptacles may then be returned to the inverted insert if desired before closing the insulated top 16.

Referring now to FIG. 5, another insert 1' of the invention is shown with a plurality of rectangular apertures 3' of various sizes. The insert may be provided with a mixture of apertures to support receptacles of various sizes and shapes as desired. Notches 22 may be provided in the flange 5' to pass the support strap to the lid that is often provided on these coolers. A transparent cover or "sneeze guard" 20 hingedly attached to support strip 21 may optionally be provided for attachment to the underside of the cooler lid by pressure sensitive adhesive to protect the contents of the receptacles. It is supported well above the receptacles to permit ready access thereto.

The above disclosed invention has a number of particular features which should preferably be employed in combination, although each is useful separately without departure from the scope of the invention. While we have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A food holding insert to be removably installed in a portable ice chest or cooler for holding receptacles that have flanged upper portions said cooler having an inner liner with vertical sides extending upward from a horizontal bottom to a shoulder at the upper portion of the cooler, the cooler having an upper edge that is provided with an insulated closure, the insert comprising:

A) a substantially planar platform having a platform plane provided with apertures, the apertures dimensioned to pass therethrough the receptacles and to prevent passage therethrough of the flanged upper portions of the receptacles, to thereby support a receptacle by the flanged upper portion;

B) a flange attached to the perimeter of the platform and disposed in a plane parallel to the platform plane and spaced apart from the platform plane by a distance great enough to hold the flanged upper portions of the receptacles above the upper edge of the cooler, and to substantially occlude the inner liner, wherein insert is resting on the upper shoulder of the cooler in the dispensing mode of operation; and C) the flange holding the platform plane below the upper edge and low enough in the cooler to enable the closure to close the cooler when the insert is inverted in the storage mode of operation.

2. The insert according to claim 1 further comprising at least one depression in the platform for retaining food dropped from a receptacle.

3. The insert according to claim 2 in which at least one of the receptacles to be held in an aperture is dimensioned to receive therein a food container with a pump top.

4. The insert according to claim 1 in which at least one of the receptacles to be held in an aperture is dimensioned to receive therein a food container with a pump top.

5. A food holding insert to be removably installed in a portable ice chest or cooler, said cooler having an inner liner with a vertical sides extending upward from a horizontal bottom to a shoulder at the upper portion of the cooler, the cooler having an upper edge that is provided with an insulated closure, the insert comprising:

A) a plurality of receptacles having flanged upper portions;

B) a substantially planar platform having a platform plane provided with apertures, the apertures dimensioned to pass therethrough the receptacles and to prevent passage therethrough of the flanged upper portions of the receptacles, to thereby support a receptacle by the flanged upper portion;

C) a flange attached to the perimeter of the platform and disposed in a plane parallel to the platform plane and spaced apart from the platform plane by a distance great enough to hold the flanged upper portions of the receptacles above the upper edge of the cooler, and to substantially occlude the inner liner, when the insert is resting on the upper shoulder of the cooler in the dispensing mode of operation; and D) the insert flange holding the platform plane below the upper edge and low enough in the cooler to enable the closure to close the cooler when the insert is inverted in the storage mode of operation.

6. The insert according to claim 5 further comprising at least one depression in the platform for retaining food dropped from a receptacle.

7. The insert according to claim 6 in which at least one of the receptacles to be held in an aperture is dimensioned to receive therein a food container with a pump top.

8. The insert according to claim 5 in which at least one of the receptacles is dimensioned to receive therein a food container with a pump top.

9. The insert according to claim 5, further comprising transparent covering means for covering the receptacles when in the dispensing mode of operation.

* * * * *